Feb. 5, 1957     H. F. DEVANEY     2,780,455
COMBINATION OF ACCELERATION SENSING AND INTEGRATING MEANS
Filed July 6, 1954

INVENTOR:
Howard F. Devaney
BY

United States Patent Office 2,780,455
Patented Feb. 5, 1957

2,780,455

COMBINATION OF ACCELERATION SENSING
AND INTEGRATING MEANS

Howard F. Devaney, Albuquerque, N. Mex., assignor, by mesne assignments, to the United States of America as represented by the United States Atomic Energy Commission Application July 6, 1954, Serial No. 441,691

14 Claims. (Cl. 264—1)

The present invention relates to the combination of acceleration sensing and integrating means, generally referred to as an accelerometer, which may be utilized for establishing or interrupting a circuit upon attainment of some desired velocity.

An object of the present invention is to provide a new and improved accelerometer.

Another object of the present invention is to provide a new and improved mechanical means for measuring acceleration.

Another object of the present invention is to provide new and improved means which may be utilized with any one of a number of different chronometric devices to provide an accelerometer.

Another object of the invention is to provide a new and improved accelerometer of rugged and reliable construction.

Another object of the invention is to provide an improved and relatively inexpensive accelerometer.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof will have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawings.

Described generally, the present invention is directed to the provision of means for varying the frequency or vibration rate of a "hairspring" in response to movement of an acceleration-responsive mass, the spring in turn regulating the oscillation rate of a balance member and escapement mechanism to thereby control movement of a train of wheels or gears, the output wheel of which may serve to close or open an electric circuit. The electric circuit may in turn control any desired mechanism, e. g., means for cutting off fuel supply of a rocket motor of a vehicle which carries the device when desired velocity is reached.

Figure 1:
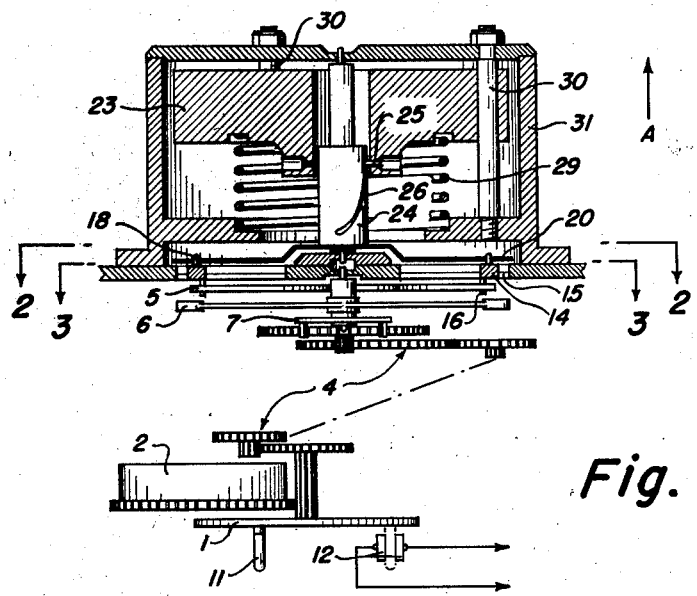
Fig. 1 is a sectional view showing one form of the present invention.
Figures 2, 4, 5:
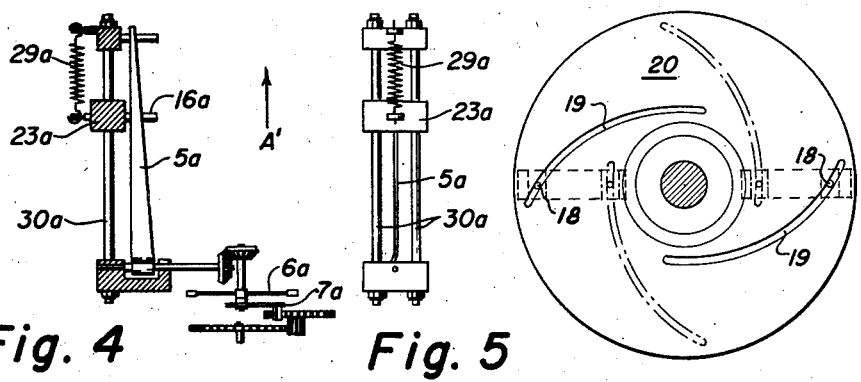
Fig. 2 is a view taken along line 2—2 of Fig. 1.
Fig. 4 is a fragmentary view showing another form of the present invention.
Fig. 5 is an end view of the device shown in Fig. 4.
Figure 3:
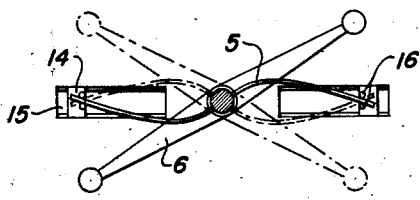
Fig. 3 is a view taken along line 3—3 of Fig. 1.

Referring more particularly to the form of invention illustrated in Figs. 1-3, there is shown an accelerometer comprising an output member 1 driven from a mainspring or any other power source 2 through an appropriate gear or wheel train 4. The movement rate of the output member 1 and wheel train 4 is controlled by the combination of hairspring 5, balance member 6 and escapement 7. When the escapement oscillates rapidly to and fro about its support, the wheel train 4 and output member 1 rotate faster than when the escapement oscillates at a slower rate; consequently under the former situation, a pin 11 carried by the output member 1 may close an electric circuit through contacts 12 or operate some mechanism after elapse of a shorter period of time than in the latter situation.

The operating rate of the mechanism is controlled by varying the effective length of the hairspring 5. When the hairspring 5 is shortened its stiffness is proportionally increased so that the balance 6 and escapement 7 swing quickly to and fro and when lengthened the time of oscillation of the balance member and escapement are proportionally increased; the speed of the wheel train 4 and output member 1 are proportionally varied.

Variation of effective hairspring length is achieved by adjusting the position of spring-restraining elements comprising guideblocks 14 disposed in guide slots 15 and having spaced projections 16 between which extend portions of the hairspring 5. Controlling pins 18 carried by the guideblocks 14 project into curved or otherwise appropriately shaped guide slots 19 of a cam 20 so that rotation of the cam 20 moves the guideblocks 14 and their spring-restraining projections 16 lengthwise of the hairspring 5 to change its effective length.

Rotation of the cam 20 may be obtained in response to movement of acceleration-sensing mass 23 through the intermediation of the cylindrical cam 24 attached to the cam 20 and provided with circumferentially spaced inclined slots 26 into which project driving pins 25 that are carried by and movable with the mass 23. When the mass 23 moves toward the cam 20, in response to movement of the apparatus in the direction of the arrow A, a component of force exerted by the pins 25 against inclined surfaces of the slots 26 causes the cylindrical cam 24 and attached cam 20 to rotate in counterclockwise direction, viewed from the top of Fig. 1. Upon such rotation edge or wall surfaces of the guide slots 19 move the guideblocks 14 and their restraining projections inwardly to shorten the effective length of the hairspring 5 and increase the oscillation rate of the balance 6 and escapement 7, so that the wheel train and output member 1 turn at a faster speed, and the actuating pin 11 may close contacts 12 after elapse of a short time. When the direction of movement of mass 23 is away from cam 20 the guideblocks move outwardly to increase the effective length of the hairspring 5 and proportionally decrease the oscillation rate of the balance 6 and escapement, so that the wheel train and output member 1 turn at slower speed and actuating pin 11 may close contacts 12 after elapse of a longer period of time.

The mass 23 may be normally supported in an "upper" position such as shown in Fig. 1 by a support spring 29 and may be directed by a plurality of guide pins 30 which extend into apertures of the mass 23 and are secured to portions of a housing 31. The cylindrical cam 24 and controlling cam 20 may be rotatably retained by portions of the housing 31 or any other casing.

The mass-supporting spring 29 may be of any suitable strength or stiffness appropriate for the conditions under which the device is to be used and for the weight of the mass 23 that is employed so that the spring will yield as may be desired in response to setback force of the mass when the device, and any carrying vehicle, is subjected to accelerating force of appropriate magnitude in the direction of the arrow A. The rearward force exerted by the mass 23 on the spring 29 is proportional to forward acceleration of the entire device.

Appropriate contour of the guide slot or slots 19, 26 in the cams 20, 24 for varying the vibration rate of hairspring 5 and actuating time of output member 1 and pin 11 will depend to a certain extent upon the characteristics of the power escapement which may be utilized; any suitable shapes may be employed.

The ratio of inertia forces on the actuating mass to frictional forces in the device may be made large so that the latter are not objectionable. If desired, a locking mechanism (not shown) may be employed for securing the device until ready for use or until attainment of some desired predetermined acceleration.

In some instances it may be preferable to utilize the form of the invention illustrated in Figs. 4 and 5, wherein movement of mass 23a along guide pins 30a varies the vibration rate of a hairspring 5a and thus the output speed of a wheel train and output member which may be similar to those of Fig. 1. A spring 29a of suitable stiffness may be employed to support the mass 23a until attainment of some predetermined velocity in the direction of the arrow A'.

The hairspring 5a is shown as of tapering width to bring out that any suitable shape may be employed which will give desired vibration rate to balance member 6a and escapement 7a.

It will be seen that the present invention provides a rugged, reliable, and inexpensive mechanical accelerometer which may embody any of a number of chronometric devices. The speed of the escapement may be made a linear function of the acceleration by utilizing a suitable cam for moving the guideblocks that vary the effective length of the hairspring. If desired, the mass supporting spring may be preloaded or a dwell angle may be built into the cam system to establish a lower limit or threshhold value of acceleration for any particular application.

As various changes may be made in the form, construction and arrangement of the parts herein without sacrificing any of its advantages, it is to be understood that all matter herein is to be interpreted as illustrative and not in a limiting sense.

I claim:

1. A device for controlling movement of a wheel train in response to acceleration comprising means including an escapement connected with said wheel train, a spring connected with said means for regulating oscillation of the escapement, means for varying the vibration rate of said spring, and means including a movable mass operatively connected with the varying means to actuate the varying means in response to acceleration.

2. A device as claimed in claim 1, wherein a plurality of guide rods are provided for directing movement of said mass.

3. A device as claimed in claim 1, wherein resilient means is provided for supporting the movable mass.

4. A device as claimed in claim 1, wherein the means for varying spring vibration rate includes a cam operatively connected with the spring and mass.

5. A device as claimed in claim 1, wherein the means for varying spring vibration rate includes a rotatable cam operatively connected with the spring and mass and rotatable in response to movement of the mass.

6. A device for controlling movement of a wheel train in response to acceleration comprising means including an escapement connected with said wheel train, a spring connected with said means for regulating oscillation of the escapement, means for varying the vibration rate of said spring, and means including a movable mass operatively connected with the varying means to shift the position of the varying means in response to acceleration.

7. A device for controlling movement of a wheel train in response to acceleration comprising means including an escapement connected with said wheel train, a spring connected with said means for regulating oscillation of the escapement, means including a restraining element adjustable lengthwise of the spring for varying the effective length of said spring, and means including a movable mass operatively connected with the restraining element to shift the position thereof in response to acceleration.

8. A device as claimed in claim 7, wherein the restraining element comprises a member having a pair of spaced apart projections with the spring extending between said projections.

9. A device as claimed in claim 7, wherein the restraining element comprises a member having a pair of spaced apart projections with the spring extending between said projections, and the movable mass is connected with the restraining element through a cam.

10. A device as claimed in claim 9, wherein the cam is rotatably mounted for rotation in response to movement of said mass.

11. A device as claimed in claim 7, wherein the spring is supported adjacent the midpoint thereof and a restraining element is provided at each side of said midpoint.

12. A device for controlling movement of a wheel train in response to acceleration comprising means including an escapement connected with said wheel train, a spring connected adjacent one end thereof with said means for regulating oscillation of the escapement, means for varying the vibration rate of said spring, and means including a movable mass operatively connected with the varying means to shift the position of the varying means along the spring toward and away from said one end in response to acceleration.

13. A device as claimed in claim 12, wherein the means for varying spring vibration rate comprises restraining members carried by and movable with the movable mass.

14. In an accelerometer, a chronometric escapement, a spring connected with the escapement for regulating oscillation thereof, means for varying the vibration rate of the spring, and a movable mass operatively connected with the varying means to actuate the varying means in response to acceleration forces.

References Cited in the file of this patent

UNITED STATES PATENTS

| | | |
|---|---|---|
| 2,371,626 | Kecskeméti | Mar. 20, 1945 |
| 2,458,016 | Morrison | Jan. 4, 1949 |
| 2,496,310 | Rabinow | Feb. 7, 1950 |